(12) United States Patent
Wunderlich et al.

(10) Patent No.: US 10,933,363 B2
(45) Date of Patent: Mar. 2, 2021

(54) METHOD FOR ASSESSING A CONDITION OF A PARTICULATE FILTER AND EXHAUST SYSTEM FOR A MOTOR VEHICLE

(71) Applicant: Daimler AG, Stuttgart (DE)

(72) Inventors: Klaus Wunderlich, Waiblingen (DE); Werner Sauter, Fellbach (DE); Rosario Pepe, Stuttgart (DE); Michael Scholz, Sindelfingen (DE); Judith Baehr, Nuertingen (DE); Julius Schwaab, Stuttgart (DE); Ramakrishnan Rajagopal, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/628,515

(22) PCT Filed: Jun. 12, 2018

(86) PCT No.: PCT/EP2018/065416
§ 371 (c)(1),
(2) Date: Jan. 3, 2020

(87) PCT Pub. No.: WO2019/007639
PCT Pub. Date: Jan. 10, 2019

(65) Prior Publication Data
US 2020/0155993 A1    May 21, 2020

(30) Foreign Application Priority Data
Jul. 6, 2017    (DE) .................... 10 2017 006 400

(51) Int. Cl.
*B01D 46/00* (2006.01)
*B01D 46/44* (2006.01)
*F01N 11/00* (2006.01)

(52) U.S. Cl.
CPC ....... *B01D 46/0086* (2013.01); *B01D 46/446* (2013.01); *F01N 11/00* (2013.01); *B01D 2279/30* (2013.01); *F01N 2550/04* (2013.01)

(58) Field of Classification Search
CPC ..................... B01D 46/0086; F01N 11/002
See application file for complete search history.

(56) References Cited

U.S. PATENT DOCUMENTS 8,069,713 B2 * 12/2011 Lienemann ............. F01N 9/002
                                                                73/114.76
8,640,441 B2 *  2/2014 Tylutki .................... F01N 3/021
                                                                60/276

(Continued)

FOREIGN PATENT DOCUMENTS

DE              93 04 573 U1    5/1993
DE     10 2005 005 055 A1    9/2005

(Continued)

OTHER PUBLICATIONS

International Search Report (PCT/ISA/210) issued in PCT Application No. PCT/EP2018/065416 dated Sep. 25, 2018 with English translation (four (4) pages).

(Continued)

*Primary Examiner* — Paul M. West
*Assistant Examiner* — Mark A Shabman
(74) *Attorney, Agent, or Firm* — Crowell & Moring LLP

(57) ABSTRACT

In a method for assessing a condition of a particulate filter for use in an internal combustion engine of a motor vehicle, a difference between a pressure exerted on the input side of the particulate filter and a pressure exerted on the output side of the particulate filter is recorded by a differential pressure sensor. The difference in pressure is taken into account when assessing the condition. Furthermore, the pressure exerted on the output side of the particulate filter in relation to the atmospheric pressure is recorded by a relative pressure (Continued)

sensor. When assessing the condition of the particulate filter, the pressure recorded by the relative pressure sensor is also taken into account. A frequency of changes in pressure and/or an amplitude load of the pressure is assessed. The invention also relates to an exhaust system for a motor vehicle.

9 Claims, 3 Drawing Sheets

(56) References Cited

U.S. PATENT DOCUMENTS

| | | |
|---|---|---|
| 2005/0061155 A1 | 3/2005 | Franey |
| 2005/0178272 A1 | 8/2005 | Kariya et al. |
| 2009/0193904 A1* | 8/2009 | Takahashi ............... F01N 3/035 73/716 |
| 2014/0318883 A1* | 10/2014 | Noguchi ............ B01D 46/0086 180/309 |
| 2015/0240696 A1* | 8/2015 | Saitou ................... F02D 41/222 73/114.76 |

FOREIGN PATENT DOCUMENTS

| | | |
|---|---|---|
| DE | 10 2014 209 718 A1 | 11/2015 |
| FR | 2 795 132 A1 | 12/2000 |
| FR | 2 920 189 A1 | 2/2009 |

OTHER PUBLICATIONS

German-language Written Opinion (PCT/ISA/237) issued in PCT Application No. PCT/EP2018/065416 dated Sep. 25, 2018 (eight (8) pages).

German-language Search Report issued in counterpart German Application No. 10 2017 006 400.8 dated Mar. 7, 2018 with partial English translation (16 pages).

"Drucksensor", Wikipedia, Jul. 2, 2017, pp. 1-4 (four (4) pages).

* cited by examiner

METHOD FOR ASSESSING A CONDITION OF A PARTICULATE FILTER AND EXHAUST SYSTEM FOR A MOTOR VEHICLE

BACKGROUND AND SUMMARY OF THE INVENTION

The present invention relates to a method for assessing a condition of a particulate filter for an internal combustion engine of a motor vehicle. In this regard, a difference between a pressure on the input side of the particulate filter and a pressure on the output side of the particulate filter is detected by means of a differential pressure sensor. The difference in pressure is taken into account when assessing the condition. In addition, the invention relates to an exhaust system for a motor vehicle.

German Publication DE 10 2005 005 055 A1 describes a fault state detection device for an exhaust purification device of an internal combustion engine. In this regard, a differential pressure sensor is applied with the pressure applied to a front and back of a diesel particulate filter. For example, using the amplitudes of the measured values of the pressure difference, it can be determined, for example, whether a tear or break is present in one of the pipes leading to the differential pressure sensor.

Determining the degree of loading of the particulate filter via a pressure measurement before and after the particulate filter using a differential pressure sensor in addition to carrying out a functional diagnosis of the particulate filter is also known from the prior art. This is because, using the differential pressure, on the one hand, the degree of the load and, on the other hand, a defect in the particulate filter can be inferred. However, it is usually necessary to operate the internal combustion engine with a high motor load and a high engine speed, in order to achieve a sufficiently selective signal. Such operating states in the internal combustion engine, which are necessary for a diagnosis or a load detection, are rarely or never achieved during normal driving, however.

The object of the present invention is therefore to create a simplified and particularly reliable method of the aforementioned type, as well as providing an exhaust system having a control device, which is designed for carrying out such a method.

This object is achieved by way of a method and an exhaust system claimed, with embodiments having expedient developments being specified in the dependent claims.

In the method according to the invention for assessing the condition of a particulate filter for an internal combustion engine of a motor vehicle, a difference between a pressure on the input side of the particulate filter and a pressure on the output side of the particulate filter is detected by means of a differential pressure sensor. The difference in pressure is taken into account when assessing the condition. In addition, the pressure on the output side of the particulate filter in relation to the ambient pressure is detected by means of a relative pressure sensor. When assessing the condition of the particulate filter, the pressure measured by means of the relative pressure sensor is also taken into account. The condition of the particulate filter is assessed by measuring a frequency of changes in pressure and/or a load amplitude of pressure. The invention is based on the premise that the particulate filter has a damping and phase-shifting retrospective effect on the pressure signal recorded on the output side of the particulate filter. In addition, the existing pressure on the input and output side of the particulate filter in the exhaust system is non-constant. Instead, pressure surges occur, which can be attributed to the emission of exhaust gas by the respective cylinders in the internal combustion engine.

By observing the temporal variation in pressure recorded by means of the differential pressure sensor and the temporal variation of the relative pressure recorded by means of the relative pressor sensor, conclusions about the condition of the particulate filter can be made in a particularly easy and particularly reliable manner. The same is also true for the load amplitude, that is to say for the temporal occurrence of pressure surges. Accordingly, a simplified and particularly reliable method is created. In addition, both pressure signals in their characteristic variations can be compared with one another, without needing to be driven at particularly high engine speeds and loads. In this way, the diagnosis with regard to assessing the condition of the particulate filter in an operating range of an internal combustion engine is possible which is constantly achieved in normal driving operation.

It is additionally preferable in this method to use the signals from sensors that are already present or sensors that are easily deployable with little effort in the forms of the differential pressure sensor and the relative pressure sensor for evaluation in order to assess the condition of the particulate sensor. In addition, it can be ensured that each user of the motor vehicle regularly runs the internal combustion engine in a diagnostic window or operating range in which the assessment of the condition of the particulate filter is possible.

Preferably, the frequency is assessed by changes in pressure detected by means of the differential pressure sensor and/or by means of the relative pressor sensor. The frequency is taken into account when assessing the condition of the particulate filter. This is based on the premise that the frequency picture or the frequency pattern (along with the phase position) of the individual pressure surges which occur in the exhaust system can be used particularly easily in order to assess the condition of the particulate filter. If the particulate filter or the exhaust system is in order, the signal delivered by the differential pressure sensor will have the same frequency as the signal delivered by the relative pressure sensor, wherein the signals indicate the detected pressure. However, should differences between the two frequency patterns detected occur, conclusions about the condition of the particulate filter and/or the sensors can be made.

Additionally or alternatively, the load amplitude is taken into account when assessing the condition of the particulate filter. In particular, it can indicate an occurrence of pressure surges which are expressed in amplitudes measured at a given time by means of the differential pressure sensor, which are compared with the occurrence of pressure surges which are expressed in amplitudes measured at a given time by means of the relative pressure sensor. If a temporal variation that is to be expected or predetermined occurs between amplitudes associated with a respective pressure surge, that is to say an amplitude that is to be expected or predetermined, it may also equally be deduced that the particulate filter is in order. If, however, deviations from the load amplitudes occur, as are then expected if the particulate filter is in order, it can be concluded that there has been a failure.

Preferably, damage or failure of a filter device of the particulate filter can be deduced when no changes in pressure are recorded by means of the differential pressure sensor, wherein the frequency measured by means of the relative pressure sensor simultaneously shows the changes in relative pressure. It can happen, for example, that, in a housing of the particulate filter, no filter device is incorporated, meaning the filter device is therefore removed, or that the filter device is damaged in such a way that the exhaust gas cannot penetrate the porous filter walls of the filter device. The differential pressure sensor then records the same pressure on the input side of the particulate filter and on the output side of the particulate filter. Accordingly, the signal delivered by the differential pressure sensor does not show an amplitude or a frequency pattern. In contrast, the signal recorded by the relative pressure sensor displays a frequency pattern. In this way, a removal or a damaging of the filter device can be established very easily.

When the filter device is removed from the housing of the particulate filter, the pressure profile and the frequency position at the measuring points on the input side and the output side of the particulate filter, that is to say, before and after the particulate filter, are equal. In order to determine the difference, if the pressure recorded on the output side is subtracted from the pressure recorded on the input side, the subtraction of the two pressures will result in a differential pressure signal of zero. On the other hand, the signal delivered by the relative pressure sensor means that the pulsations in pressure in the exhaust system can be identified, which can be attributed to the periodic emission of exhaust gas from the cylinders of the internal combustion engine at the respective speed. Through a comparison of the signal delivered by the differential pressure sensor with the signal delivered by the relative pressure sensor within a predetermined time frame, failure of the filter device of the particulate filter can be deduced.

It has also been shown to be advantageous, when a fault is detected in a pressure pipe leading from the differential pressure sensor to a connection point for the pressure pipe available on the input side of the pressure sensor, if respective frequencies of changes in pressure are recorded by means of the relative pressure sensor, wherein the respective frequencies have amplitudes opposite to one another. For example, when the pressure pipe has fallen away or has been ripped off from the connecting point on the input side, the pressure signal recorded by means of the differential pressure sensor on the input side of the particulate filter is equal to zero. On the other hand, the relative pressure sensor records the changes in pressure on the output side of the particulate filter using the frequency which is attributable to the emission of the exhaust gas from the individual cylinders in the internal combustion engine.

If the pressure signal recorded on the output side by means of the differential pressure sensor is subtracted from the pressure signal recorded on the input side by means of the differential pressure sensor, the result is a phase shift of 180 degrees to the pressure sensor which is recorded with the relative pressure sensor. A subtraction of the signal delivered by the differential pressure sensor and the signal delivered by the relative pressure sensor will also give a result of zero. By observing or analysing the corresponding frequency patterns delivered by the differential pressure sensor on the one hand and by the relative pressure sensor on the other, failure in the pressure pipe leading to the connection point on the input side of the particulate filter can easily be deduced.

A failure in a pressure pipe which leads from the differential pressure sensor to a connection point available on the output side of the particulate filter can preferably be deduced when no changes in pressure are detected by means of the relative pressure sensor, wherein the frequency recorded by means of the differential pressure sensor additionally displays the changes in pressure. For example, when the pressure pipe leading to the connection point on the output side has fallen away or has been ripped off from an exhaust pipe of the exhaust system, the relative pressure sensor does not deliver a signal showing any amplitudes or frequency pattern, but rather a substantially constant signal. In contrast, the signal recorded by the differential pressure sensor shows the frequency with which pressure surges are present in the exhaust system on account of the emission of the exhaust gas through the cylinders of the internal combustion engine. Here, by comparing the signals delivered by the differential pressor sensor on the one hand and by the relative pressure sensor on the other hand, failure in the pressure pipe leading to the output side of the particulate filter can also easily be deduced.

Furthermore, a failure in the differential pressure sensor and/or the relative pressure sensor can be deduced when a pattern of frequency recorded by means of the differential pressure sensor and/or the relative pressure sensor differs from a frequency pattern of the changes in pressure to be expected on account of the operation of the internal combustion engine. If the differential pressure sensor or the relative pressure sensor are in order, the signal delivered by the differential pressure sensor or the relative pressure sensor can be assigned to an engine order, that is to say an order of the internal combustion engine. In particular, the frequency depends on the rotational speed of the internal combustion engine. Therefore, a relevant engine order corresponds approximately to the rotational speed of the internal combustion engine multiplied by a factor of 0.5 (in the case of a four-stroke operating process of the internal combustion engine) times the number of cylinders which apply the particulate filter with exhaust gas. If the number of pressure surges recorded by the sensors per minute in the exhaust system is substantially the same as the determined value, the frequency impression can be attributed to the calculated engine order. If the frequency impression or the pattern of frequency corresponds to the expected pattern of the respective engine speed, it can be deduced that the respective sensor is in order.

In order to analyze the signal, a Discrete Fourier Transformation (DFT), in particular a Fast Fourier Transformation (FFT), can be used. If this results in a low signal-to-noise ratio, or if the frequency impression or the pattern of frequency detects all engine frequencies, damage or failure in the respective sensor can be deduced.

It has been shown to be further advantageous when a rotational speed of the internal combustion engine is determined based on the frequency recorded by means of the differential pressure sensor and/or the relative pressure sensor, and the determined rotational speed is compared with a measured rotational speed of the internal combustion engine. In this way, it can be very easily established whether the frequency recorded by means of the differential pressure sensor and/or the relative pressure sensor is in accordance with the frequency expected with the rotational speed of the internal combustion engine. Accordingly, the frequency recorded by means of the differential pressure sensor or the relative pressure sensor can be controlled with regard to plausibility. This serves as a quality control. In addition, such a comparison of the particular rotational speed with the rotational speed measured can be taken into account when recognizing a defect in the differential pressure sensor or the relative pressure sensor.

Preferably, a loading of the particulate filter is determined using a change in the pressure detected by means of the differential pressure in relation to the pressure detected by the relative pressure sensor. This is because the relationship between the differential pressure sensor and the relative pressure sensor changes with increasing loading of the particulate filter. The amplitude of the differential pressure sensor, in particular, increases with increasing loading of the particulate filter, while the signal of the relative pressure sensor remains substantially constant or even decreases. The amplitude of the differential pressure sensor increases until a threshold value for a maximum loading of the particulate filter which is dependent on the load of the internal combustion engine and relative to the respective engine speed. Through a comparison of the pressure recorded by means of the differential pressure sensor with the pressure recorded by means of the relative pressure sensor, the loading of the particulate filter can therefore be determined very easily.

Preferably, the condition of the particulate filter is determined while the internal combustion engine is operated with at least one rotational speed from a rotational speed range which ranges from an idle speed to a middle rotational speed of the internal combustion engine in relation to a maximum permissible speed of the internal combustion engine. In the near-idling operating range of the internal combustion engine, comparatively few exhaust gas emissions are present in the individual cylinders of the internal combustion engine per unit of time. Accordingly, the pressure surges are comparatively far apart temporally. This facilitates the pressure measuring method as a function of time by means of the differential pressure sensor or by means of the relative pressure sensor.

Furthermore, the condition of the particulate filter is preferably determined while the internal combustion engine is operated with a delayed ignition timing. This is because the exhaust gas thereby has a high impulsivity, thus resulting in a particularly strongly pulsating exhaust gas mass flow. Accordingly, the individual pressure surges which result from the emission of exhaust gas of the cylinder of the internal combustion engine have high amplitudes. Thus, the temporal variation of pressure can be recorded particularly well and frequency patterns in the change of pressure in particular are easily visible. In particular, the warm-up of the internal combustion engine in the near-idling operating range with a correspondingly delayed moment of ignition is particularly good for determining the condition of the particulate filter through the analysis of the pressure signal delivered by the differential pressure sensor on the one hand and the relative pressure sensor on the other.

The exhaust system for a motor vehicle according to the invention comprises a particulate filter which can be supplied with exhaust gas of an internal combustion engine of the motor vehicle. A control device serves to assess a condition of the particulate filter. By means of a differential pressure sensor, a difference between a pressure exerted on an input side of the particulate filter and a pressure exerted on an output side of a particulate filter can be recorded. The control device is designed to take the difference in pressure into account when assessing the condition. The exhaust system comprises a relative pressure sensor, by means of which the pressure exerted on the output side of the particulate filter can be recorded in relation to the ambient pressure. The control device is additionally designed to take the pressure recorded by means of the relative pressure sensor into account when assessing the condition of the particulate filter, and to additionally assess a frequency of changes in pressure and/or an amplitude load of the pressure. The control device of the exhaust system is thus designed for implementing the method according to the invention.

In particular, the control device is capable of assessing the sensor signals delivered by the differential pressure sensor and the relative pressure sensor in the context of diagnostics as well as validating the assessments with regard to the engine speed, that is to say the rotational speed of the internal combustion engine.

The advantages and preferred embodiments described in connection with the method according to the invention also apply to the exhaust system according to the invention and vice versa.

Further advantages, features and details of the invention are apparent from the following description of a preferred exemplary embodiment as well as with the aid of the drawings. The features and feature combinations described in the description above as well as the features and feature combinations shown below in the description of the figures and/or shown solely in the figures are applicable not only in the respectively specified combination, but also in other combinations or on their own, without exceeding the scope of the invention.

DETAILED DESCRIPTION OF THE INVENTION

Figure 1:
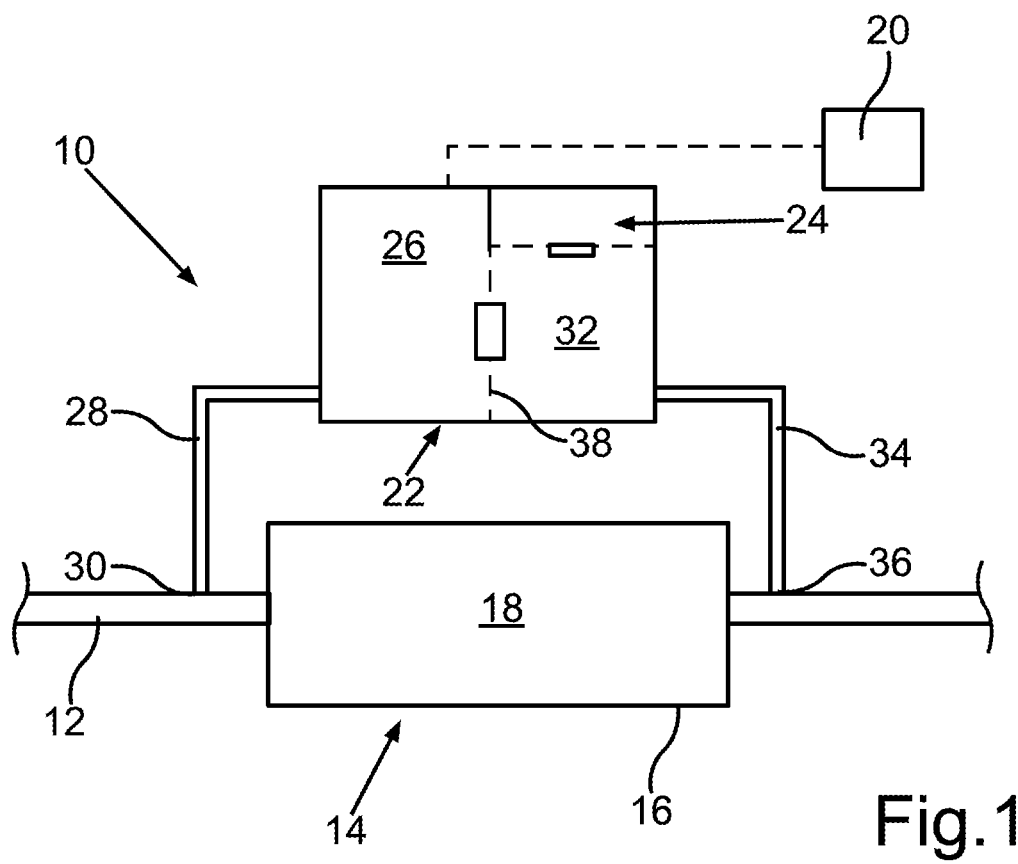
FIG. 1 is a highly schematic cross-sectional representation of an exhaust system of a motor vehicle, wherein upstream or downstream pressures of a particulate filter are recorded by means of a differential pressure sensor and by means of a relative pressure sensor.

FIG. 1 shows a highly schematic representation of a section of an exhaust system 10 of a motor vehicle. The exhaust system 10 comprises an exhaust pipe 12, through which exhaust gas of an internal combustion engine (not shown) of the motor vehicle is guided to a particulate filter 14. The particulate filter 14 comprises a housing 16 and a filter device 18 arranged in the housing 16. The components of the exhaust system 10 shown in FIG. 1 are shown merely schematically and do not indicate the actual size proportions of the illustrated components relative to one another.

Presently, the condition of the particulate filter 14 is assessed by means of a control device 20, for example in the form of a controller. For this, readings are supplied to the control device 20, which are recorded by a differential pressure sensor 22 and a relative pressure sensor 24. A first chamber 26 of the differential pressure sensor 22 is fluidically connected to an input side of the particulate filter 14 by a first pressure pipe 28. The first pressure pipe 28 is connected to the exhaust pipe 12 at a connection point 30 on an input side of the particulate filter 14 for this purpose.

In an analogous fashion a first chamber 32 of the differential pressor sensor 22 is connected to the particulate filter 14 via a second pressure pipe 34 on the output side. Accordingly, the second pressure pipe 34 on the output side of the particulate filter 14 is connected to the exhaust pipe 12, and then to a further connection point 36. The chambers 26, 32 are separated from each other via a chamber separating wall 38. Depending on the pressures prevailing in the chambers 26, 32, the differential pressure or the difference between the pressure exerted on the input side of the particulate filter 14 and the pressure exerted on the output side of the particulate filter 14 is recorded. The relative pressure sensor 24 records the pressure exerted on the output side of the particulate filter 14 in relation to the atmospheric pressure.

The differential pressure signal to be calculated by the control device 20 is thus formed out of the relative pressures in front of the particulate filter 14 and after the particulate filter 14, with the particulate filter being an Otto particulate filter, that is to say a particulate filter for Otto vehicles fuelled by petrol. The particulate filter 14, however, can also be formed as a diesel particulate filter. The relative pressure signal present after or downstream of the particulate filter 14 and the relative pressure signal recorded by means of the relative pressure sensor 24 is also calculated by the control device 20.

Presently, the frequency impression and the phase position of the pressures recorded by the differential pressure sensor 22 and the relative pressure sensor 24 are calculated in order to assess the condition of the particulate filter 14. For example, it can be deduced that the particulate filter 14 is in order when the differential pressure signal has the same frequency as the relative pressure signal which is measured downstream of the particulate filter 14 by means of the relative pressure sensor 24. In addition, the relationship between the differential pressure signal and relative pressure signal changes with increased loading of the particulate filter 14. This is because the amplitude of the differential pressure signal increases up to a threshold value for a maximum loading of the particulate filter 14. In contrast, the relative pressure recorded downstream of the particulate filter 14 stays substantially constant, or the relative pressure reduces. Accordingly, the relationship increases with increased loading of the particulate filter 14. A regeneration of the particulate filter 14 is then preferably carried out when a threshold value or a predetermined threshold value of the relationship is achieved.

Figure 2:
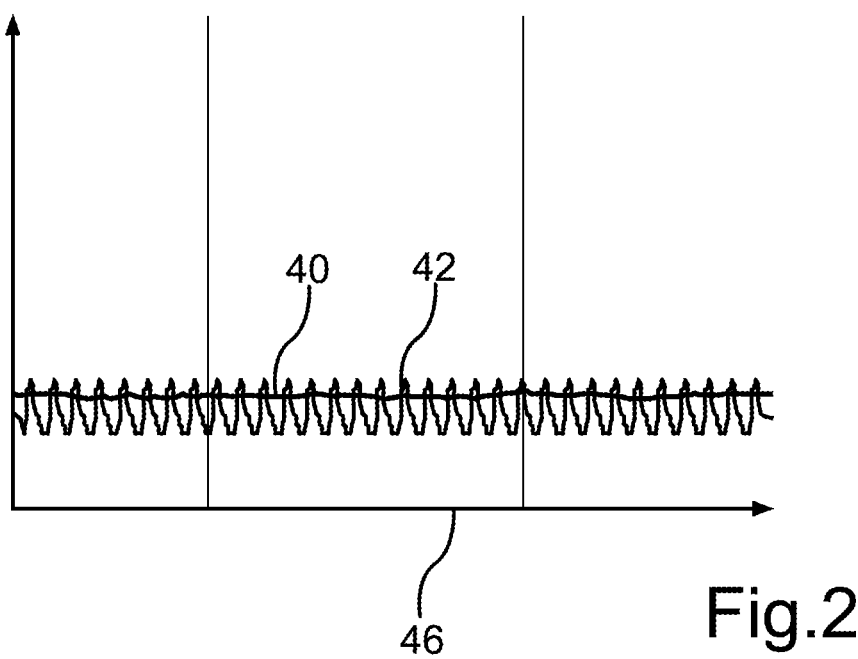
FIG. 2 shows the temporal variation of the signal delivered by the differential pressure sensor and the relative pressure sensor in the case of a filter device of the particulate filter removed from a housing of the particulate filter.

FIG. 2 shows a case, by means of which it can be deduced that the filter device 18, in which exhaust gas flows through when the exhaust system 10 is in operation, and, in doing so, removes the particles from the exhaust gas, is removed from the housing 16. In FIG. 2 a first curve 40 shows the signal delivered by the differential pressure sensor 22. This pressure signal does not show any amplitude or any frequency pattern. A further curve 42 shows the signal delivered by the relative pressure sensor 24. Consecutive changes in pressure or pressure surges occurring with a particular frequency can be recognized in the curve 42. These pressure surges result from the emission of exhaust gas out of the cylinders of the internal combustion engine. In the case of the removed filter device 18, the differential pressure sensor 22 concurrently records the same pressure on the input side of the particulate filter 14 and on the output side of the particulate filter 14. By subtracting the pressures recorded, the differential pressure signal is zero, such that the curve 40 runs in a substantially straight line.

The ordinate in FIG. 2 is an axis of time 46. An analysis of the pressures applied over the axis of time 46 results in the following properties: Because the relative pressure sensor 24 sees or delivers the pulsating pressure signal, by taking into account the pressure delivered by the differential pressure sensor 22 as a function of time (curve 40) and the pressure delivered by the relative pressure sensor 24 as a function of time (curve 42), it can be deduced that the filter device 18 is removed from the housing 16.

Figure 3:
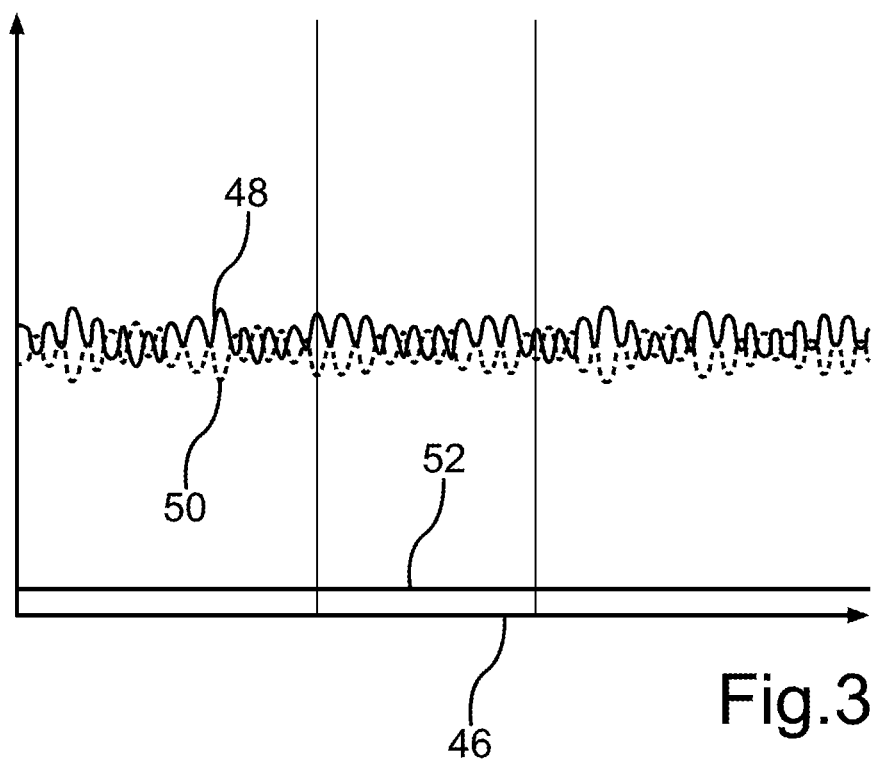
FIG. 3 shows the signal delivered by the differential pressure sensor and the relative pressure sensor in a case where a pressure pipe upstream of the particulate filter is not connected to an exhaust pipe of the exhaust system.

By means of FIG. 3 a situation is shown in which the control device 20 establishes, when assessing the condition of the particulate filter 14, that the first pressure pipe 28 is no longer connected to the exhaust pipe 12 at the connection point 30. For example, the pressure pipe 28 might have fallen away from the exhaust pipe 12.

In FIG. 3, a curve 48 in turn shows the differential pressure signal, that is to say the temporal variation of the pressure recorded by means of the differential pressure sensor 22. The differential pressure is produced by subtracting the pressure upstream of the particulate filter 14, that is to say the pressure prevailing in the chamber 26, and the pressure recorded downstream of the particulate filter 14, that is to say the pressure prevailing in the chamber 32. In this regard, the pressure in the chamber 32 is taken away from the pressure in the chamber 26.

The pressure signal upstream of the particulate filter 14 is, however, zero in the situation shown in FIG. 3. The curve 48 shows a particular frequency pattern with individual pressure surges. However, this pressure signal is offset by 180 degrees in phase relative to the pressure signal, which is delivered by the relative pressor sensor 24 and which is illustrated in FIG. 3 by a second curve 50. Subtracting the relative pressure signal from the differential pressure signal results in a substantially constant curve 52, which is also shown in FIG. 3.

Figure 4:
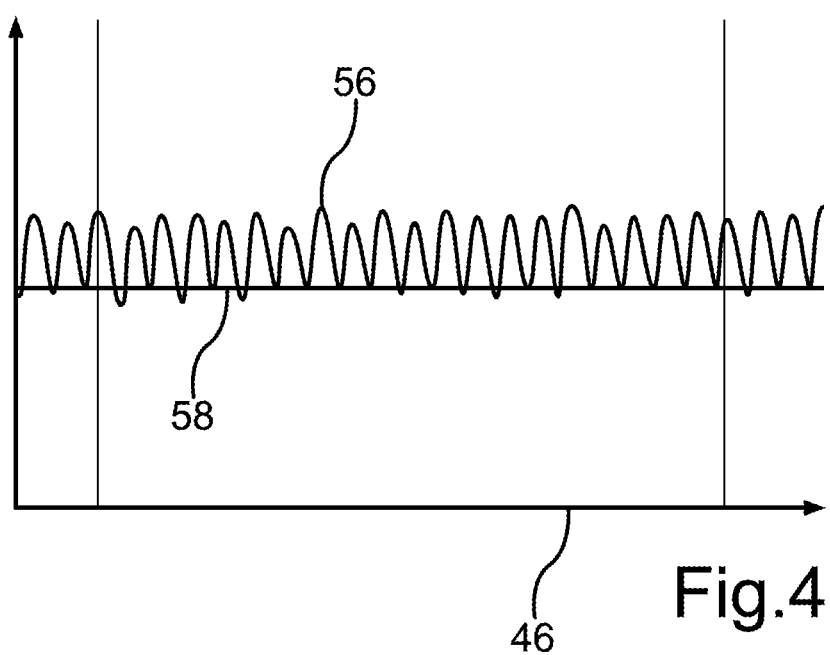
FIG. 4 shows the signal delivered by the differential pressure sensor and the relative pressure sensor in a case where a pressure pipe downstream of the particulate filter is not connected to the exhaust pipe of the exhaust system.

FIG. 4 is a graphical representation of the case in which the second pressure pipe 34 has fallen away from the exhaust pipe 12, in which therefore the second pressure pipe 34 is no longer connected to the exhaust pipe 12 at the connection point 36. Here, a curve 56 illustrates the pressure signal delivered by the differential pressure sensor 22, which shows the changes in pressure as a function of time with a particular frequency. In contrast, the relative pressure sensor 24 delivers a constant signal which is illustrated in FIG. 3 by a further constant curve 58.

Figure 5:
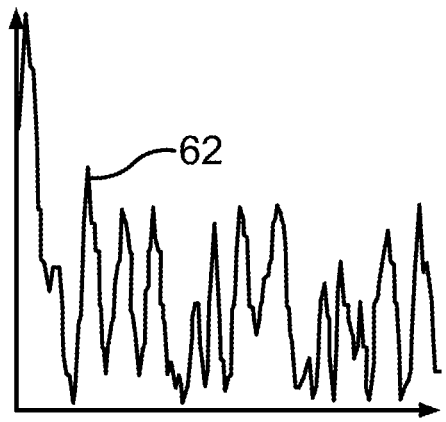
FIG. 5 shows a frequency impression delivered by the differential pressure sensor and a frequency impression delivered by the relative pressure sensor for a sensor in good working order.
Figure 5:
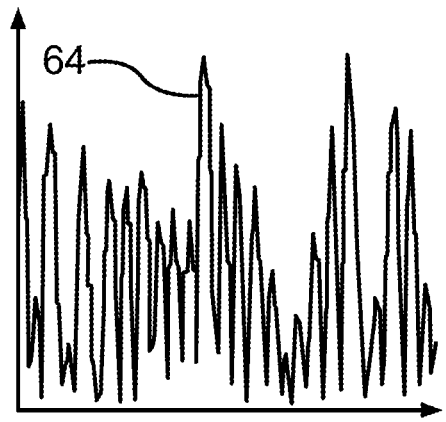

By analyzing the respective signal delivered by the differential pressure sensor 22 and the relative pressure sensor 24, it can also be established whether one of these sensors is damaged. For example, in a depiction on the left of FIG. 5, a curve 62 is shown, in which the frequency of an engine order can be assigned according to the rotational speed of the internal combustion engine. This is because, in the curve 62, which shows the signal delivered by the differential pressure sensor 22, clearly distinct pressure surges are recognizable. Analogously, the relative pressure sensor 24 delivers a frequency impression which is illustrated by a further curve 64 in the right representation in FIG. 5. Here, the individual pressure surges can also be attributed to the pulsations in exhaust gas which originate from the emission of exhaust gas through the individual cylinders of the internal combustion engine for the respective rotational speed or engine speed.

Figure 6:
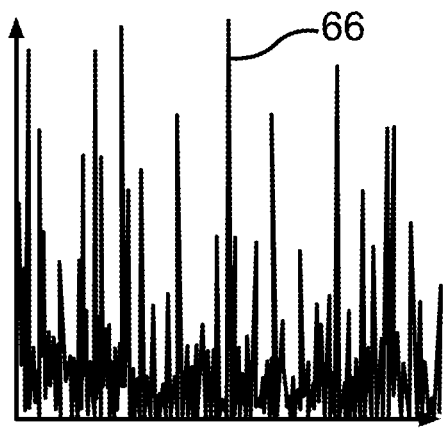
FIG. 6 shows a frequency impression delivered by the differential pressure sensor and a frequency impression delivered by the relative pressure sensor for a damaged sensor.
Figure 6:
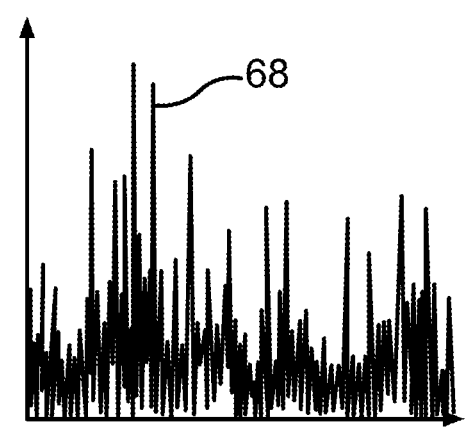

In contrast, a curve 66 in the left representation of FIG. 6 and a further curve 68 in the right representation of FIG. 6 show the respective signals of a damaged differential pressure sensor 22 (left representation) and a damaged relative pressure sensor 24 (right representation). This results in a low signal-to-noise ratio and the respective frequency impression does not follow an engine order corresponding to the engine speed. Rather, the frequency impression perceives all engine frequencies without the signals also being able to be assigned to the pulsations of the exhaust gas, that is to say the emissions of the exhaust gas carried out by the cylinders of the internal combustion engine.

If the sensors, on the other hand, are in order, the pulsations or pressure surges observed, which occur in the exhaust pipe 12, can be attributed to the emission of exhaust gas of each cylinder of the internal combustion engine. In this regard, the frequency of the rotational speed of the engine (in revolutions per minute) divided by 60 times the number of cylinders, which emit exhaust gas per revolution of the engine, which can be attributed to the particulate filter 14. Using this link, the plausibility of the frequencies recorded by the differential pressure sensor 22 or the relative pressure sensor 24 can be checked. This is because the rotational speed of the internal combustion engine can be determined or calculated using the frequencies observed. If the result of this calculation corresponds to the rotational speed of the internal combustion engine measured by means of a rotational speed sensor, this allows it to be said that the signal or frequency impression delivered by the differential pressure sensor 22 or the relative pressure sensor 24 is realistic.

The invention claimed is:

1. A method for assessing a condition of a particulate filter for an internal combustion engine of a motor vehicle, in which, by way of a differential pressure sensor, a difference between a pressure exerted on an input side of the particulate filter and a pressure exerted on an output side of the particulate filter is recorded, comprising:
   recording, by means of a relative pressure sensor, the pressure exerted on the output side of the particulate filter in relation to an ambient pressure,
   observing a temporal variation in pressure recorded by means of the differential pressure sensor and a temporal variation in relative pressure recorded by means of the relative pressure sensor,
   determining the presence or absence of particulate filter damage or failure and at least one of a frequency of changes in pressure and an amplitude load of pressure from the temporal variations observed, and
   deducing the presence of damage to or failure of a filter device of the particulate filter when no changes in pressure are recorded by the differential pressure sensor and the frequency recorded by way of the relative pressure sensor does not show changes in the relative pressure.

2. The method according to claim 1, wherein the frequency of changes in pressure is determined by way of at least one of the differential pressure sensor and the relative pressure sensor.

3. The method according to claim 2, wherein a failure in a pressure pipe, leading from the differential pressure sensor to a connection point for the pressure pipe located on the input side of the particulate filter, is deduced when respective frequencies of the changes in pressure are recorded by way of the differential pressure sensor and the relative pressure sensor, which have opposing amplitudes.

4. The method according to claim 2, wherein a failure of a pressure pipe, leading from the differential pressure sensor to a connection point located on the output side of the particulate filter for the pressure pipe, is deduced when no changes in relative pressure are recorded by the relative pressure sensor, and the frequency recorded by way of the differential pressure sensor additionally shows the changes in pressure.

5. The method according to claim 2, wherein a failure in at least one of the differential pressure sensor and the relative pressure sensor is deduced when a frequency pattern recorded by way of at least one of the differential pressure sensor and the relative pressure sensor differs from an expected pattern of frequencies of the changes in pressure on account of running of the internal combustion engine.

6. The method according to claim 2, wherein, based on the frequency recorded by way of at least one of the differential pressure sensor and the relative pressure sensor, a rotational speed of the internal combustion engine is determined, and the determined rotational speed is compared with a measured rotational speed of the internal combustion engine.

7. The method according to claim 1, wherein, by using a change in pressure recorded by way of the differential pressure sensor in relation to the pressure recorded by way of the relative pressure sensor, a loading of the particulate filter is determined.

8. The method according to claim 1, wherein the condition of the particulate filter is determined while the internal combustion engine is operated with a delayed ignition time and with at least one rotational speed from a rotational speed range ranging from an idle speed to a maximum permissible speed of the internal combustion engine, or from a middle rotational speed of the internal combustion engine.

9. An exhaust system for a motor vehicle, comprising:
   a particulate filter to which exhaust gas of an internal combustion engine of the motor vehicle can be supplied,
   a control device for assessing a condition of the particulate filter,
   a differential pressure sensor, by way of which a difference between a pressure exerted on an input side of the particulate filter and a pressure exerted on an output side of the particulate filter can be recorded, and
   a relative pressure sensor by which the pressure exerted on the output side of the particulate filter can be recorded in relation to an ambient pressure, wherein
   the control device is configured to determine the difference between the pressures when assessing the condition of the particulate filter, and
   the control device is designed, when determining the presence or absence of particulate filter damage or failure, to assess a frequency of changes in the pressure, an amplitude load of the pressure, or both a frequency of changes in the pressure and an amplitude load of the pressure, and deduce the presence of damage to or failure of a filter device of the particulate filter when no changes in pressure are recorded by the differential pressure sensor and the frequency recorded by way of the relative pressure sensor does not show changes in the relative pressure.

* * * * *